Jan. 6, 1948.  W. W. DE LANEY ET AL  2,434,035
PROCESS OF MAKING RUBBER GLOVES AND LIKE ARTICLES
Filed April 2, 1941   2 Sheets-Sheet 2

LIQUID LATEX

LIQUID COAGULANT & DRYING AGENT

LIQUID LATEX

AERATED LATEX

GLOVE TURNED UPRIGHT

WATER SPRAY

COAGULANT SPRAY.

Inventors
Wallace W. De Laney
Cornelius J. Crowley
By Rockwell & Bartholow
Attorneys Patented Jan. 6, 1948

2,434,035

UNITED STATES PATENT OFFICE 2,434,035

PROCESS OF MAKING RUBBER GLOVES AND LIKE ARTICLES

Wallace W. De Laney and Cornelius J. Crowley, New Haven, Conn., assignors to The Seamless Rubber Company, New Haven, Conn., a corporation of Connecticut Or'ginal appl'cation April 15, 1938, Serial No. 202,201. Divided and this application April 2, 1941, Serial No. 386,468

17 Claims. (Cl. 18—58.5)

This invention relates to improvements in methods of making rubber articles such as the rubber glove disclosed in our application Serial No. 202.201, filed April 15, 1938, now Patent No. 2,393,298 issued January 22, 1946, of which the present application is a division.

While not limited thereto, our invention pertains more especially to the production of latex gloves having roughened surfaces. Latex gloves are generally recognized as superior in many respects to those made of rubber cement, but the ordinary latex glove has a serious disadvantage in that, due to its high rubber content, its outer surface when wet is extraordinarily slippery. It has been attempted to overcome this drawback by crinkling the surfaces of the gloves, which may be accomplished, at least to a certain degree, by steps including the use of a suitable vulcanizing medium, followed by the swelling of the skin of the rubber prior to complete vulcanization. In our experience, however, such treatment of the rubber has not produced satisfactory results. The crinkling of the rubber in this manner produces valleys in the surface of the rubber. These valleys are quite irregular or tortuous, but even so we find the valley or furrow form of roughening unsuitable for bringing about a non-slipping grip on articles when the gloves are wet. In our experience, also, it has been extremely difficult, if not impossible, to obtain uniform roughening of gloves of different batches where the gloves were roughened by prior processes.

One of the objects of our invention is to provide a process by which a glove or other article having a superior surface roughening or finish can be produced in a satisfactory manner.

The invention also aims to provide an improved process for the manufacture of rubber gloves and other articles, which enables a uniform product of attractive appearance to be produced at relatively low cost.

Figure 1:
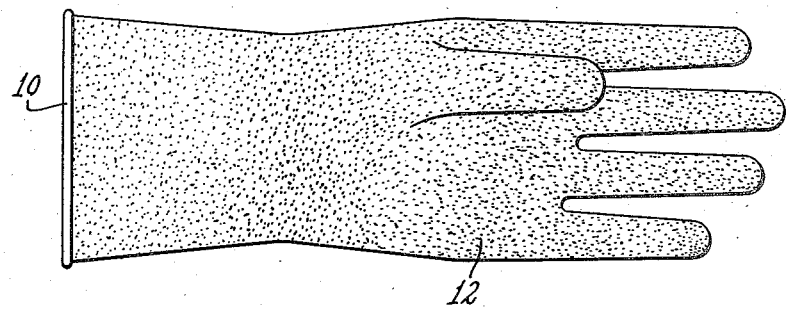
Fig. 1 is an elevation of a rubber glove made by our improved process.
Figure 2:
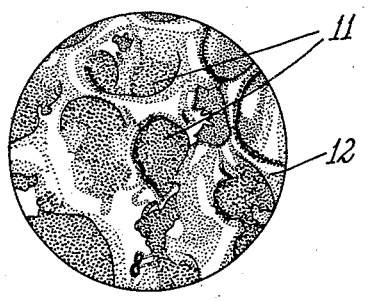
Fig. 2 shows the appearance of the outer roughened surface of the glove under the microscope.
Figure 3:
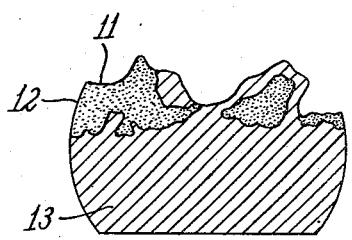
Fig. 3 is a microscopic sectional view of the glove's wall.
Figure 4:
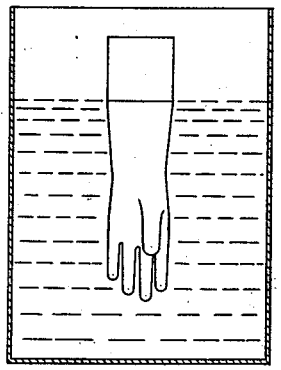
Figs. 4 to 10, inclusive, illustrate certain steps in a preferred example of the process of manufacture.
Figure 5:
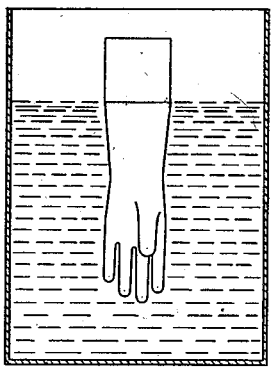
Figure 6:
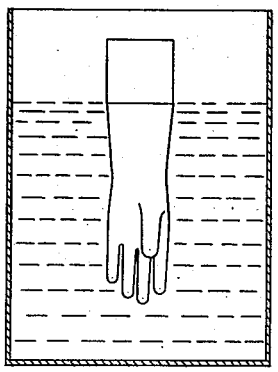
Figure 7:
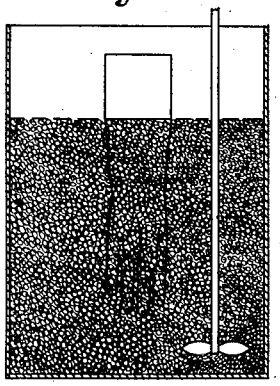

In the latex glove selected to illustrate the product, the entire exterior surface, except for the usual bead 10 at the wrist, is roughened so as to provide a non-slipping surface. The character of this surface will be apparent from Figs. 2 and 3, which show the same as viewed under the microscope, the article being magnified approximately 25 diameters in Fig. 2 and approximately 65 diameters in Fig. 3. We have discovered that a very satisfactory surface for rubber gloves, and particularly latex gloves, is created by providing the exterior surface with fine cavities or depressions in the nature of minute, closely associated pits, open cells, or cups. These pits or cups preferably should not be in excess of .032 of an inch in diameter, and they are of different diameters, and yet under the circumstances remarkably uniform in diameter, and, moreover, they are very closely grouped together so that at no point on the glove surface to be roughened are such pits or cups absent. In the form illustrated there are approximately 1200 pits or pockets to the square inch. Moreover, in addition to the fact that these pits are closely grouped, they provide an outer layer very open in effect, which may be compared to lace, and which is open from the outer surface substantially to an under layer, over which the lace-like layer extends. According to the practice which we prefer for the best all-around results, bearing in mind the durability of the glove wall, as well as the best non-slipping effect, the cells or pits such as shown at 11 in Fig. 2 are of a diameter of the order of 500 microns. It will be noted, moreover, that as viewed under the microscope, the edges of these pits are somewhat broken or ragged as a result of what seems to be an effect of explosion of gas in the process hereinafter described.

Under the cellular portion or layer 12 of the glove wall, which is at the exterior of the glove, the wall has a solid portion 13 of rubber latex integrally joined to the cellular portion. It will be noted that in the process of manufacture as hereinafter described, the solid portion 13 is provided by superimposing one layer of rubber latex on another.

In making a glove such as described, the preferred procedure involves the dipping of a form into a dispersion of latex compound containing, for example, the following ingredients by dry weight:

| | Parts |
|---|---|
| Rubber (as 62% latex) | 100 |
| Sulphur | 1 |
| Zinc oxide | 3 |
| Accelerator | ¾ |
| Anti-oxidant | ½ |
| Lithophone | 10 |
| Color | 1 |
| Glue | 1 |

It is preferred to disperse all of the ingredients except the latex in a water medium, the glue (for example) being used as a dispersing agent, and the dispersion then added to the latex; but various changes can be made in this respect.

After dipping the form in this dispersion (which is relatively thin so as to run easily), the rubber-coated form is dipped in a tank containing a liquid coagulating and drying agent. This coagulating bath may comprise, for example, one part of acetic acid, one part of acetone, and one part of alcohol. These particular proportions are given merely by way of example, and it will be understood that the proportions will require changing from time to time if there is change in drying conditions. After the form is withdrawn from the coagulant tank, the coating of rubber thereon is permitted to stand and dry for a short time, say, a few minutes, after which the form is given a second coat of latex by dipping it into a second tank containing preferably a latex dispersion identical with that above described, it being understood that this second latex layer is laid on a first layer in the process of coagulation under the action of the adhering coagulant.

The form is then withdrawn from the second latex dispersion, and after a short wait, say, a few minutes, is dipped in an aerated latex dispersion contained in a suitable tank. In the tank in which this last dispersion or bath is contained, suitable agitating and aerating means are provided for bringing about and facilitating the production of minute bubbles in this liquid (which is also quite thin so as to run easily). For this purpose of agitating and aerating, we prefer to place in the last-mentioned tank a stirrer of appropriate type, and this produces a liquid or foam containing throughout its entire body closely grouped minute bubbles or air cells.

After dipping in this liquid, the form is withdrawn and turned right side up, so that the fingers are uppermost, and there is a short wait, say, of one or two minutes' duration, during which the following phenomena occur. First, the trapped air within the soft rubber escapes, and the beginning of this is noted almost immediately at the tips of the fingers, where the surface of the rubber opens up, with a change of appearance, accompanying what is apparently a bursting of bubbles of air within the rubber. This operation proceeds very rapidly, the opening up of the surface moving from the tips of the fingers over the remaining area of the glove. During this part of the process, as the entrapped air escapes from the outer surface (which phenomenon may be due to the coagulant advancing through the second dip, and continuing on through the aerated or cellular dip), there is created a movement of the latex at the surface which, coupled with the movement of draining or running (since the latex is not as yet coagulated) forms large drops on the surface comparable in form to those of a momentary spray of water upon a pane of glass. These large drops are at this stage pretty well distributed over the entire surface of the glove.

At this stage of the process the dipped form is washed by being sprayed with water. The effect of this water is to remove the drops referred to above and leave the glove with a clear, clean surface. The next step is to spray the dipped form with a coagulant for setting the rubber. The coagulant may comprise the usual coagulating ingredients. The glove is then dried, for example by exposing it to warm air for a suitable period. After this the glove can be rolled to form the bead 10, vulcanized, and stripped from the form, all in the customary or any preferred manner.

Figure 8:
Figure 9:
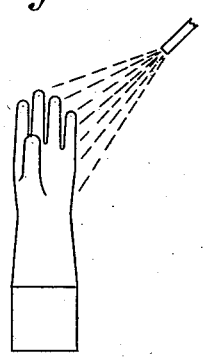
Figure 10:
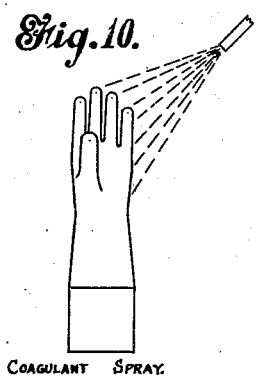

Certain steps in the process of manufacture, as above referred to, are illustrated in Figs. 4 to 10 inclusive. Figs. 4 to 7 inclusive illustrate the dipping steps as above described; Fig. 8 shows the glove turned upright for draining; Fig. 9, the step of washing; and Fig. 10, the later coagulating step.

In some cases the roughened surface on the exterior of the glove may be provided only over the fingers and a part of the thumb and a part of the palm and knuckle portion of the glove, the remainder of the exterior surface being left smooth.

We do not limit ourselves to a process in which the form is given two dips of solid latex as distinguished from the aerated or cellular latex, as variation may be made in this respect. It is also possible by our invention to provide a glove of very attractive appearance by providing dips of different colors, for example, by having the aerated, or "cellular" dip of a contrasting color. It is understood that under these circumstances, while the layers flow together, there is at the zone of juncture a definite demarcation of color. Owing to the thinness of the cellular layer or coat and the fact that it is of such open or lacy character, there is usually visible through this coat (if there is sufficient color contrast) the underlying coat of solid latex, and this provides a rubber glove having an especially attractive appearance, this latter being due in part to the effect of color gradation which is produced in this manner.

The improved glove has an exterior surface with a very agreeable "feel" resembling that of a textile fabric. The open cells at the exterior provide a most satisfactory non-slipping surface. It is believed to be of importance that a number of minute separate voids are provided which are shut off from each other. In other words, they are of rounded and closed conformation, forming pits which it is believed act to an extent as minute vacuum cups. By providing such a surface as herein described, there is created such a "cling" of the hand to the object handled as is necessary to prevent slipping or dropping.

The finished glove is quite thin, having, for example, a wall thickness of the order of .016". As the outer layer is of such light and open texture, it does not appreciably add to the weight or thickness of the glove wall. Bearing in mind that the glove is a latex glove, its very flexible character will be well understood. It is of light weight and comfortable to the wearer, owing to the fact that it exerts less tension or pull on the hand than would be the case if the outer layer were not of cellular character, while nevertheless at the same time the outer layer has considerable effect in increasing the strength and durability of the glove wall. While the glove wall contains a certain amount of entrapped air in the outer layer, the amount of this is reduced to a minimum, being of the order of 6%, and usually in any case much less than 15% of the volume of the outer layer.

In the example above described, vulcanization is effected by adding sulphur and an accelerator to the latex compound, and heating the glove for drying purposes, but we do not limit ourselves to this procedure, as vulcanization can be effected in any of the various ways common in the art.

The latex used is preferably the ordinary latex of commerce, having about 60% of solids, but variation may be made in this respect, and we may, if desired, use natural, purified, concentrated, or partially coagulated or stabilized latex, as conditions may require, and we may in some cases use a latex which is vulcanized, or partially vulcanized.

By our process, as above described, the production of a very satisfactory glove or like article can be accomplished within a remarkably short period of time. For saving time artificial coagulation is preferred, but it will be understood that this is not necessary in all cases. Different compounding ingredients may be used with the latex, as will be apparent to those skilled in the art. We believe that glue is a desirable ingredient of the rubber dip, as it makes the liquid sufficiently heavy for good dipping conditions, and at the same time prevents the formation of blisters, while on the other hand in no manner interfering with the formation of the minute air cells in the outer layer.

There is, of course, no necessity of using a hydrocarbon solvent, as in a cement dipping process, and this is a feature of advantage as regards cost, and it is understood, of course, that one of the many advantages of a latex glove over a rubber cement glove is the absence of a strong rubbery odor.

Whereas dipping is the procedure preferably employed, the improved glove can be made, if desired, by spraying, brushing, electro-deposition, coagulation, or like processes.

In our process it is a distinct advantage that vulcanization can be effected by incorporating in the bath a suitable vulcanizing agent or agents, and using a moderate amount of heat at a later stage, such heat also having a drying effect. Although it is possible to use chemical vapors for vulcanizing, this is not preferred, and, in fact, it is a matter of advantage that it can be dispensed with.

We prefer to have the pitted surface extend continuously and uniformly over the entire surface of the glove or a substantial portion thereof, but it is not necessary in all cases to remove the large drops of material that continue to adhere to the surface after the waiting period above mentioned has elapsed. We may spray the article with the coagulant without removing these drops, in which case the glove will have drop-like excrescences where the drops have been solidified. Such a glove we find quite satisfactory for some uses, e. g., for painting and work of a similar character where additional roughening of the glove surface is unobjectionable, or, in fact, desirable. In such case the pits or open cells fill the spaces between the bumps or excrescences.

Various other changes can be made in the details without departing from the principles of our invention, and the scope of the annexed claims.

What we claim is:

1. The method of making a rubber article which comprises producing a shaped body of non-porous unvulcanized rubber constituting the article proper, applying to at least a portion of the surface of said body a coating of latex foam, collapsing the foam, and drying and vulcanizing the rubber article.

2. The process of making rubber gloves which comprises applying a solid layer of rubber to a form, then applying to said layer a layer of uncured rubber having a multiplicity of air cells, and treating the uncured rubber to cause the collapse of air cells at the outer surface of the glove to thereby provide a non-slipping surface.

3. The process of making rubber gloves which comprises dipping a form in latex to create a solid layer of rubber thereon, then dipping the form in aerated latex, treating the rubber to cause the air cells in the second layer to collapse, and then drying the glove.

4. The process of making rubber gloves which comprises dipping a form in latex to create a solid coat, dipping the form in aerated latex, and treating the article with a liquid which causes collapse of the air cells at the outer surface of the glove.

5. The process of making rubber gloves which comprises dipping a form in latex to create a solid coat, dipping the form in aerated latex, and dipping the form in a liquid which causes collapse of the air cells at the outer surface of the glove, said liquid being a coagulant.

6. The process of making rubber gloves and similar articles which comprises applying solid coats of liquid latex to a form with intermediate use of coagulant, and then applying to the rubber on the form a coat of aerated liquid latex.

7. The process of making rubber gloves and similar articles which comprises applying to a suitable form a layer of solid liquid latex, applying a coagulant to said layer, and later applying a layer of aerated liquid latex to the rubber on the form.

8. The process of making rubber gloves and similar articles which comprises forming a partially coagulated latex layer on a form, then applying to said layer an aerated layer, and, then after a waiting period washing, coagulating, and drying.

9. The process of making rubber gloves and similar articles which comprises applying coats of uncured latex to a form with intermediate use of a coagulant, then applying to the rubber a coat of aerated latex foam, venting the air from the foam by collapsing it under the effect of the coagulant as the article remains on the form, and drying.

10. The process of making latex gloves and similar articles which comprises producing a shaped body of non-porous unvulcanized rubber constituting the article proper, applying to at least a portion of the surface of said body a coating of latex foam, venting the foam of air by collapsing it as the article remains on the form, washing the article, applying a coagulant to the outer surface, and drying.

11. The process of making rubber gloves and similar articles which comprises applying a coat of uncured latex to a form, then applying a coagulant, applying a coating of latex foam, venting the air from the foam under the effect of the coagulant as the article remains on the form, washing, then applying a coagulant, and then drying.

12. The process of making rubber gloves and similar articles which comprises the production of a shaped body of uncured latex, applying to at least a portion of the surface of said body a coating of latex foam, causing the collapse of the foam by the use of a coagulant, clearing the surface by applying water thereto, then applying a coagulant and drying.

13. The method of making a rubber article which comprises forming a shaped layer of unvulcanized rubber, applying to said layer a relatively thin layer of latex foam, collapsing the foam completely so as to produce an open lacy roughening layer, and drying and vulcanizing the rubber article.

14. A process of making latex gloves and similar articles which comprises applying to a form layer of uncured latex, applying to said layer in the presence of a coagulant a layer of aerated latex so as to cause bursting of air bubbles contained in said layer, draining the second layer during the bursting of air bubbles and incidental formation of surface drops of latex, removing the drops by washing, and then drying the article.

15. The method of forming a dipped latex article having alternate layers of foamed latex and of impervious latex, said method comprising alternately dipping a suitable form into unfoamed liquid latex and into liquid latex foam, the dipping into one of said kinds of latex being either before, after or intermediate the dipping into the other kind of latex, at least partly drying the deposited latex after each dipping and after the last dipping finally drying and removing the article from the form.

16. The method of forming a dipped latex article having alternate layers of foamed latex and of impervious latex, said method comprising alternately dipping a suitable form into unfoamed liquid latex and into liquid latex foam, the dipping into the foamed latex being either before or after the dipping into the unfoamed latex, at least partly drying the deposited latex after each dipping and after the last dipping finally drying and removing the article from the form.

17. The method of producing a porous surface on spongy material of foam rubber or the like, which comprises subjecting an exposed surface of the foam rubber after shaping to a desired form to a fluid spraying operation, and thereafter curing the foam rubber.

WALLACE W. DELANEY.
CORNELIUS J. CROWLEY.

REFERENCES CITED

The following references are of record in the file of this patent:

UNITED STATES PATENTS

| Number | Name | Date |
|---|---|---|
| 1,045,234 | Willis et al. | Nov. 26, 1912 |
| 1,685,954 | Morimoto | Oct. 2, 1928 |
| 1,929,603 | Murphy et al. | Oct. 10, 1933 |
| 1,719,633 | Teague | July 2, 1929 |